(No Model.)

F. M. NEUHAUSEN.
ROCK CANDY BOX.

No. 309,644. Patented Dec. 23, 1884.

Witnesses:
W. C. Corlies.
A. M. Best.

Inventor
Frank M. Neuhausen
By Colburn & Thacher
Attorneys

United States Patent Office.

FRANK M. NEUHAUSEN, OF CHICAGO, ILLINOIS, ASSIGNOR OF ONE-HALF TO H. F. LINSEL, OF SAME PLACE.

ROCK-CANDY BOX.

SPECIFICATION forming part of Letters Patent No. 309,644, dated December 23, 1884.

Application filed May 12, 1884. (No model.)

*To all whom it may concern:*

Be it known that I, FRANK M. NEUHAUSEN, a subject of the Emperor of Germany, and residing at Chicago, in the county of Cook and State of Illinois, have invented certain new and useful Improvements in Rock-Candy Boxes, which are fully set forth in the following specification, reference being had to the accompanying drawings, in which—

Figure 1:
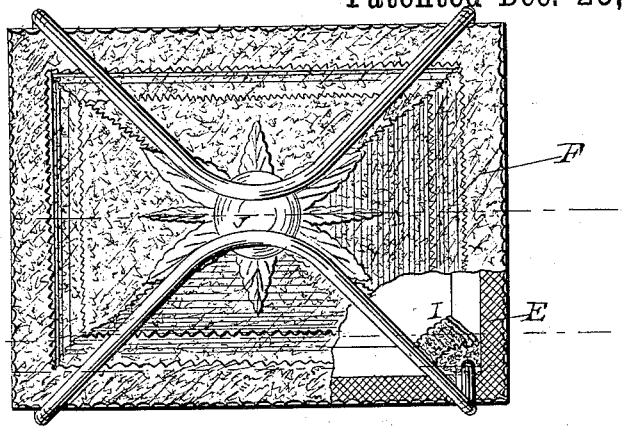
Figure 2:
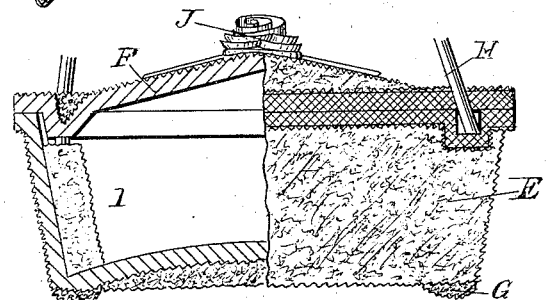
Figure 3:
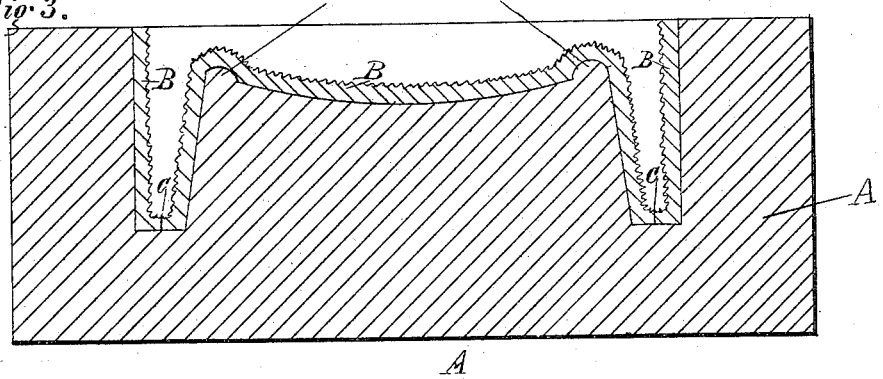

Figure 1 represents a top or plan view of my box with a portion of the cover cut away. Fig. 2 represents a side elevation with a portion of the box cut in section. Fig. 3 is a cross-section of the mold in which the body of the box is made, and Fig. 4 a cross-section of the mold in which the cover of the box is made.

The object of my invention is to make a box of rock-sugar with a roughened or crystallized exterior and a smooth interior, the body of the box being made in one piece and the top or cover of the box being made in one piece; and my invention consists in a box, as a new article of manufacture, made of rock-sugar, and having a smooth inside and a crystallized roughened exterior.

In the accompanying drawings, A represents a plaster-of-paris mold. The form of the mold is the same as the interior of the body of the box that is to be made on the mold. I have shown a rectangular box; but any other shape may be made with equal facility. The sugar of which the box is to be made is melted and boiled to the proper consistency and poured into the mold A, and is allowed to remain therein for a day or two. The crystallization of the sugar takes place upon the surface of the mold A, and as indicated by B. The crystallized sugar that comes in contact with the mold A forms a smooth surface; but the other surface is left in a roughened crystallized form, because there is no surface with which it comes in contact, the liquid or uncrystallized portion of the sugar standing upon this surface. After the crystallization has entirely taken place the box B is taken from the mold and the uncrystallized portion poured off and the rim of the box separated at C, leaving the body of the box E in the form shown in Figs. 1 and 2, and indicated by E.

Figure 4:
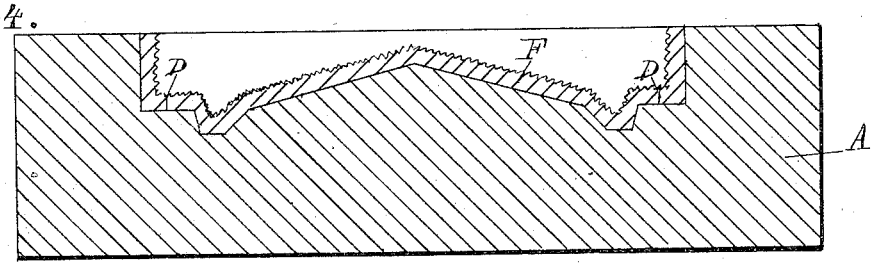

In Fig. 4 I have represented the form of the mold in which the cover F of the box is made. The pattern of the cover is first stamped into the mold, which is made of plaster-of-paris. The pattern being removed, the prepared sugar is poured into the mold and allowed to stand there till the crystallization takes place. The inner surface of the cover is smooth, because it comes in contact with the surface of the mold, while the outer surface of the cover is a crystallized roughened surface, it being in contact with the uncrystallized or watery portion of the sugar. The rim of the crystallized portion is cut off at D, and the cover is left in the shape shown in Figs. 1 and 2.

In making the molds for the body of the box the projections F' are placed on the corners to make the legs G of the box. There are also projections left on the molds near the corners to make recesses for the cords which form the handles of the box to pass through. These recesses may be either in the cover or in the edge of the body of the box, as shown in Fig. 2. The handles H of the box pass through the recesses into the interior of the box, and are secured there by being molded in the candy, or by any suitable attachment, as shown at I, in the corners of the box.

Instead of using cords, I may use ribbon or other suitable material.

J represents a knob on the top of the cover of the box to form a handle by which it is removed. This may be attached to the cover of the box; or, by making the mold in which the cover is formed with the projection at its middle, it can be formed on the cover in the form of a knob, leaving its exterior surface a roughened crystallized surface, such as forms the exterior of the balance of the box.

By using what is known as "rock-candy" in the manufacture of my box, it crystallizes in coarse crystals and makes a rough exterior surface when manufactured in the manner above described, while the interior of the box, which comes in contact with the mold before the sugar crystallizes, has a smooth surface, and I therefore have a box made of rock-candy suitable for toys or candy and many small articles presenting an exterior appearance which is both novel and pleasing.

It will be observed that I can vary the form of my box very readily without varying the process of manufacture or the article produced in any other way except in its shape.

Having thus fully described my box and the method of its manufacture, what I claim, and desire to secure by Letters Patent, is—

1. A new article of manufacture, a box made of rock-candy, with a smooth interior and a roughened crystallized exterior.

2. The process of manufacturing rock-candy boxes with a smooth interior and a roughened exterior, as specified and shown.

FRANK M. NEUHAUSEN.

Witnesses:
L. L. COBURN,
H. F. LINSEL.